US009254860B2

(12) United States Patent
Mihara et al.

(10) Patent No.: US 9,254,860 B2
(45) Date of Patent: Feb. 9, 2016

(54) OUTER COLUMN AND STEERING COLUMN APPARATUS

(71) Applicant: NSK LTD., Tokyo (JP)

(72) Inventors: Shin Mihara, Gunma (JP); Hiroyuki Hattori, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/397,217

(22) PCT Filed: Feb. 6, 2014

(86) PCT No.: PCT/JP2014/052792
§ 371 (c)(1),
(2) Date: Oct. 27, 2014

(87) PCT Pub. No.: WO2014/125998
PCT Pub. Date: Aug. 21, 2014

(65) Prior Publication Data
US 2015/0122075 A1 May 7, 2015

(30) Foreign Application Priority Data

Feb. 13, 2013 (JP) ................................. 2013-025778
Sep. 30, 2013 (JP) ................................. 2013-204908

(51) Int. Cl.
B62D 1/185 (2006.01)
B62D 1/184 (2006.01)
B60R 25/021 (2013.01)
(52) U.S. Cl.
CPC ................ B62D 1/185 (2013.01); B62D 1/184 (2013.01); B60R 25/021 (2013.01)

(58) Field of Classification Search
CPC .............................. B62D 1/184; B62D 1/185
USPC .............................................. 74/493; 280/775
See application file for complete search history.

(56) References Cited

U.S. PATENT DOCUMENTS 5,979,265 A * 11/1999 Kim et al. ........................ 74/493
2005/0093283 A1 * 5/2005 Yamada ........................ 280/775
(Continued)

FOREIGN PATENT DOCUMENTS

JP 2005-138644 A 6/2005
JP 2009-006847 A 1/2009
(Continued)

OTHER PUBLICATIONS

International Search Report and Written Opinion dated Mar. 11, 2014, from the corresponding PCT/JP2014/052792.

Primary Examiner — Paul N Dickson
Assistant Examiner — Darlene P Condra
(74) Attorney, Agent, or Firm — Katten Muchin Rosenman LLP

(57) ABSTRACT

A steering-column apparatus minimizes the force required for expanding or contracting the portion where an inner column fits and is supported and improves the ease of operation for adjusting the position of a steering wheel. A split is provided in the bottom surface of the front section of an outer column includes a main slit section in the axial direction and a sub slit section in the circumferential direction, with the front-end section of the main slit section being open on the edge on the rear side thereof. The length from the main slit section to one end section in the circumferential direction of both end sections in the circumferential direction of the sub slit section, is longer than the length from the main slit section to the other end section in the circumferential direction.

5 Claims, 14 Drawing Sheets

(56) References Cited

U.S. PATENT DOCUMENTS

| | | | |
|---|---|---|---|
| 2006/0028010 A1* | 2/2006 | Yamada | 280/775 |
| 2010/0000366 A1* | 1/2010 | Nomura et al. | 74/493 |
| 2010/0242665 A1* | 9/2010 | Nagamura et al. | 74/493 |
| 2010/0294072 A1* | 11/2010 | Ishii et al. | 74/493 |
| 2012/0193901 A1* | 8/2012 | Jouta et al. | 280/775 |

FOREIGN PATENT DOCUMENTS

| | | |
|---|---|---|
| JP | 2009-202636 A | 9/2009 |
| WO | 2006/011378 A1 | 2/2006 |

* cited by examiner

OUTER COLUMN AND STEERING COLUMN APPARATUS

TECHNICAL FIELD

The present invention relates to a steering apparatus, and more particularly relates to a steering column apparatus of a telescopic steering apparatus that makes it possible to adjust the forward/backward position of a steering wheel, and to an outer column of that steering column apparatus.

BACKGROUND ART

FIG. 14 illustrates an example of a conventional steering apparatus for applying a steering angle to steered wheels. In this steering apparatus, a steering shaft 3 is supported on the inner-diameter side of a cylindrical shaped steering column 2 that is supported by a vehicle body 1 so as to be able to rotate freely, and a steering wheel 4 is supported by the rear-end section of the steering shaft 3. The rotation of the steering wheel 4 is transmitted to an input shaft 8 of a steering-gear unit 7 by way of a universal joint 5a, an intermediate shaft 6 and a universal joint 5b. As the input shaft 8 rotates, a pair of tie rods 9 that are located on both side of the steering-gear unit 7 are pushed or pulled, which applies a steering angle to a pair of left and right steered wheels according to the amount that the steering wheel 4 is operated.

In the construction illustrated in FIG. 14, a telescopic mechanism is assembled for adjusting the forward/backward position of the steering wheel 4 according to the size and operating posture of the operator. The telescopic mechanism comprises a steering column 2 that is constructed by combining an inner column 10 and an outer column 11 in a telescopic shape so as to be able to freely extend or contract, and a steering shaft 3 that is constructed by combining together an outer tube 12 and an inner shaft 13 by a spline joint so that torque can be transmitted, and so as to be able to freely extend and contract.

In the illustrated example, a tilt mechanism that makes it possible to adjust the up/down position of the steering wheel 4 is also assembled. Furthermore, an electric-powered power steering apparatus having an electric motor 14 as an auxiliary power source is assembled to reduce the force necessary for operating the steering wheel 4. More specifically, a housing 15 that houses a worm gear reducer of the electric-powered steering apparatus is connected and fastened to the front-end section of the inner column 10, and the housing 15 is supported by the vehicle body 1 so as to be able to pivotally displace around a horizontal shaft 16. A displacement bracket 18 that is fastened to the outer column 11 is supported by a support bracket 17 that is supported by a different location of the vehicle body 1 so as to be able to displace freely in the forward/backward direction and up/down direction. Together with constructing the steering column 2 so as to be able to freely extend and contract, by supporting the steering column 2 such that the support bracket 17 is able to break away and displace in the forward direction due to an impact load during a secondary collision, it is also possible to construct a mechanism for reducing impact that is applied to the body of an operator that hits the steering wheel 4.

In the case of a tilt mechanism and telescopic mechanism, except for the electric-powered mechanism, the operating state is switched by the operation of an adjustment lever between a state in which the position of the steering wheel 4 can be adjusted and a state in which the adjusted position of the steering wheel 4 can be maintained. For example, in the case of the conventional construction illustrated in FIG. 15, by providing a slit 19 that extends in the axial direction on the bottom surface of the front half of the outer column 11, it is possible to elastically expand or contract the inner diameter of the front section of the outer column 11. A pair of supported sections 20 that constitute the displacement bracket 18 are fastened to portions on both sides in the width direction of the slit 19 of the outer column 11, and a longitudinally elongated hole 21 that extends in the axial direction (forward/backward direction) is formed in portions of these supported sections 20 that are aligned with each other. The support bracket 17 comprises a pair of support-plate sections 22 that are parallel with each other and that hold the pair of supported sections 20 from both sides in the width direction; and vertically elongated holes 23 that extend in the up/down direction and that are partially arc shaped around the horizontal shaft 16 are formed in these support-plate sections 22. An adjustment rod 24 is inserted through the longitudinally elongated hole 21 and the vertically elongated holes 23.

An expansion/contraction mechanism that is constructed by a cam apparatus 26 or the like, the cam apparatus 26 comprising a drive-side cam 27 and a driven-side cam 28, is assembled on the adjustment rod 24, and makes it possible to increase or reduce the space between the pair of support-plate sections 22. The driven-side cam 28 engages with a vertically elongated hole 23 that is formed in one of the support-plate sections 22 so as to be able to displace only along the vertically elongated hole 23. A nut 29 is screwed onto and fastened to a portion of the tip-end section of the adjustment rod 24, that protrudes from the outside surface of the other of the pair of support-plate sections 22, and a thrust bearing 30 and pressure plate 31 are provided between the outside surface of the other support-plate section 22 and the nut 29. An engaging piece 32 that is provided on the inside surface of the pressure plate 31 engages with the vertically elongated hole 23 that is formed in the other support-plate section 22 so as to be able to displace only along the vertically elongated hole 23.

When adjusting the position of the steering wheel 4, the adjustment lever 25 rotates and drives the drive-side cam 27, which reduces the dimension in the axial direction of the cam apparatus 26, increases the space between the driven-side cam 28 and the nut 29, and releases the force of the pair of support-plate sections 22 against the pair of supported sections 20. At the same time, the inner diameter of the portion of the front section of the outer column 11 that fits with and supports the inner column 10 is elastically expanded, reducing the pressure that acts on the area of contact between the inner-circumferential surface of the outer column 11 and the outer-circumferential surface of the inner column 10. In this state, the up/down position and forward/backward position of the steering wheel 4 can be adjusted within the range that the adjustment rod 24 is able to displace inside the longitudinally elongated hole 21 and the vertically elongated holes 23.

Rotating and driving the drive-side cam 27 in the opposite direction using the adjustment lever 25 increases the dimension in the axial direction of the cam apparatus 26, which reduces the space between the inside surfaces that face each other of the driven-side cam 28 and nut 29, and the pair of supported sections 20 are firmly held by the pair of support-plate sections 22. At the same time, the inner diameter of the portion of the front section of the outer column 11 that fits with and supports the inner column 10 is elastically reduced, and the pressure that acts on the area of contact between the inner-circumferential surface of the outer column 11 and the outer-circumferential surface of the inner column 10 increases. In this state, the up/down position and the forward/backward position of the steering wheel 4 are maintained in the adjusted positions.

In order to maintain the flexibility of the portion of the front section of the outer column 11 that fits with and supports the inner column 10, normally, the slit 19 is opened up and formed in the front-end edge of the outer column 11. In this case, the rigidity of the front-end edge of the outer column 11, which is the open end side of the slit 19, becomes a minimum, and the rigidity of the outer column 11 increases toward the closed-end side of the slit 19, so the force by which the outer column 11 supports the inner column 10 changes according to the forward/backward position of the steering wheel 4. On the other hand, it is feasible for both end sections in the forward/backward direction of the slit 19 to be closed-end sections that are not open on the end edges of the outer column; however, in that case, the force required for operating the adjustment lever increases.

WO2006/011378 (A1) discloses construction in which a slit comprises a main slit section that is formed in the axial direction, and a sub slit section that is formed in the circumferential direction on at least one end section of both end sections in the forward/backward direction of the main slit, with the end section in the axial direction of the main slit being open to the middle section in the circumferential direction of sub slit section such that the shape of the slit as seen from the radial direction is a T shape or H shape. With this construction, together with being able to maintain the flexibility of the fitting and supporting portion of the outer column and keep the force required for increasing or reducing the inner diameter of that portion low, it is possible to a certain extent to stabilize the force by which the outer column supports the inner column regardless of the forward/backward position of the steering wheel. However, with this construction as well, there is still plenty of room for improvement in order to improve the operability when adjusting the position of the steering wheel, and further stabilizing the force by which the outer column supports the inner column.

RELATED LITERATURE

Patent Literature

[Patent Literature 1] WO2006/011378 (A1)

SUMMARY OF INVENTION

Problem to be Solved by Invention

Taking into consideration the problem described above, the object of the present invention is to achieve construction of a steering column apparatus that is capable improving the operability when adjusting the position of the steering wheel by keeping the force required for increasing or reducing the inner diameter of the portion of the outer column that fits with and supports the inner column small, and is capable of further stabilizing the force by which the outer column supports the inner column Means for Solving Problems The outer column of the present invention is part of a steering column apparatus that is applied to a telescopic steering apparatus. The outer column is formed using a metal material into a cylindrical shape as a whole, and comprises a slit and a pair of supported sections. The slit is formed in one half section in the axial direction and is for decreasing the rigidity in the radial direction of the one half section in the axial direction. The pair of supported sections is provided in positions on both sides in the width direction of the slit, with through holes formed in portions thereof that are aligned with each other.

Particularly, in the outer column of the present invention, the rigidity in the width direction of one half section in the width direction of the portion where the slit is formed is less than the rigidity in the width direction of the other half section in the width direction of the portion where the slit is formed.

More specifically, the range where the slit is formed in the one half section in the width direction is larger than the range where the slit is formed in the other half section in the width direction. For example, this construction is achieved by placing a slit in the circumferential direction so as to be deviated to the side of the one half section in the width direction, or placing a slit in the axial direction so that at least part thereof is inclined in a direction from the center section in the width direction toward the side of the one half section in the width direction.

In an embodiment of the present invention, the slit comprises: a main slit section that is formed in the axial direction; and a sub slit section that is formed in the circumferential direction of at least one end section of both end sections in the axial direction of the main slit section, with the end section in the axial direction of the main slit section being open to part in the circumferential direction of the sub slit section. The length in the circumferential direction from the main slit section to one end sections of both end sections of the sub slit section, which is in the one half section in the width direction, is longer than the length in the circumferential direction from the main slit section to the other end section which is in the other half section in the width direction.

In another embodiment of the present invention, the portion near at least one end section in the axial direction of the slit extends in the circumferential direction from the center section in the width direction toward the side of the one half section in the width direction while going toward the one end section in the axial direction. This embodiment includes construction in which the entire slit extends in the circumferential direction from the center section in the width direction toward the side of the one half section in the width direction.

The above two embodiments of the present invention can be embodied at the same time. In other words, the slit can comprise a main slit section, with a portion near at least one end section in the axial direction thereof extending in the circumferential direction from the center section in the width direction toward the side of the one half section in the width direction while going toward the one end section in the axial direction; and a sub slit section that is formed in the circumferential direction on at least one of the end sections of both end sections in the axial direction of the main slit section, with the end section in the axial direction of the main slit section being open to part in the circumferential direction thereof.

In the outer column of the present invention, preferably a lock through hole into which a lock pin of a steering-lock apparatus is inserted, is provided in part of the other half section in the axial direction on the side of the other half in the width direction. Furthermore, preferably, the lock through hole is formed in a portion where the phase in the circumferential direction is separated from the slit.

The steering apparatus of the present invention comprises a steering column, a support bracket, a rod-shaped member and an expansion/contraction mechanism. The steering column is constructed by combining together any one of the outer columns of the present invention and an inner column that fits with and is supported by one half section in the axial direction of the outer column so that one half section in the axial direction of the inner column is able to displace in the axial direction, and the steering column is able to extend or contract freely in the axial direction. An extendable/contractible steering shaft is supported on the inside of the steering column so as to be able to rotate freely.

The support bracket supports the steering column with respect to the vehicle body such that at least the forward and backward position of the steering wheel can be adjusted, and the support bracket comprises a pair of support-plate sections that are located on both sides in width direction of the pair of supported sections, and insertion holes are formed in portions of the pair of support-plate sections that are aligned with each other.

The rod-shaped member is inserted in the width direction through the through holes and the insertion holes and comprises a pair of pressure sections in portions on both ends thereof that face the outside surfaces of the pair of support-plate sections. The expansion/contraction mechanism increases or reduces the space between the inside surfaces of the pair of support-plate sections by increasing or reducing the space between the pair of pressure sections.

Particularly, in the steering column apparatus of the present invention, together with constructing the outer column with the outer column of the present invention, the rigidity in the width direction of one support-plate section of the pair of support-plate sections, that is arranged on the outside in the width direction of the supported section on the side of the one half section in the width direction is less than the rigidity in the width direction of the other support-plate section that is arranged on the outside in the width direction of the supported section on the side of the other half section in width direction.

With the steering apparatus of the present invention, when the outer column is arranged on the rear side and the inner column is arranged on the front side, the through holes are constructed by longitudinally elongated holes that extend in the axial direction of the outer column, and when the outer column is arranged on the front side and the inner column is arranged on the rear side, the through holes are constructed by simple circular holes.

Effect of Invention

With the present invention, it is possible to keep the force required for increasing or reducing the portion of the outer column that fits with and supports the inner column small, and improve the ease of operation when adjusting the position of the steering wheel. In other words, in the outer column, the rigidity in the width direction of the one half section in the width direction where one of the supported sections is located, of the portion where the slit is formed, is less than the rigidity in the other half section in the width direction where the other supported section is located, of the portion where the slit is formed. Therefore, in a state in which the force that presses the pair of supported sections from both sides in the width direction is released in order to adjust the forward/backward position of the steering wheel, the one half section in the width direction of the outer column where the rigidity is sufficiently low easily deforms, and the contact pressure between the inner-circumferential surface of the outer column and the outer-circumferential surface of the inner column is sufficiently reduced or lost. Therefore, it is possible to easily adjust the forward/backward position of the steering wheel. Moreover, after the steering wheel has been adjusted to a desired position, by deformation of the one half section in the width direction of the outer column, the force that presses the supported sections from both sides in the width direction can be effectively used as a force for reducing the inner diameter of the portion that fits with and supports the inner column, and it is possible to maintain the force by which the outer column supports the inner column without particularly increasing the force that the supported sections are pressed from both sides in the width direction.

In the steering column apparatus of the present invention, of the pair of support-plate sections that hold the pair of supported sections, which are provided on the outer column, from both sides in the width direction, the rigidity in the width direction of one of the support-plate sections that is located outside in the width direction of the supported section on the side of the one half section in the width direction, is less than the rigidity in the width direction of the other support-plate section that is located outside in the width direction of the supported section on the side of the other half section in the width direction. Therefore, on the side of the one half section in the width direction of the outer column, both the outer column and one support-plate section easily deform, so the effect of the present invention is further obtained, and when compared with the conventional technology, the ease of operation when adjusting the position of the steering wheel is remarkably improved, and it becomes possible to further stabilize the force by which the outer column supports the inner column.

MODES FOR CARRYING OUT INVENTION

First Example

Figure 14:
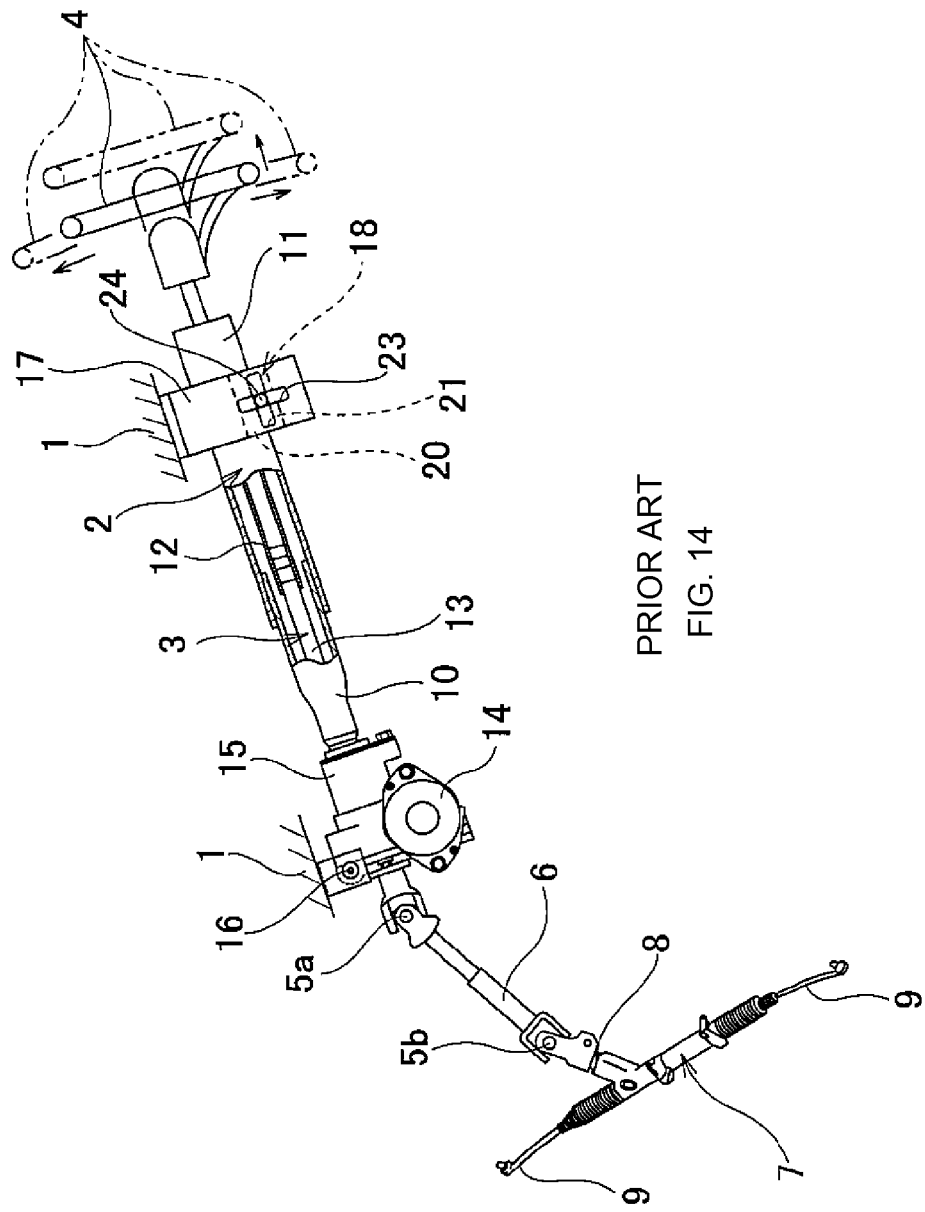
FIG. 14 is a partial cut-away side view that illustrates an example of a conventional automobile steering apparatus.

FIG. 1 to FIG. 8 illustrate a first example of an embodiment of the present invention. A feature of the outer column and steering column apparatus of the present invention, including this example, is improving operability when adjusting the position of the steering wheel 4 (refer to FIG. 14) by keeping the force required for increasing or reducing the fitting and support portion 33 by devising the shape of a slit 19a that is provided in the outer column 11a. The construction and operation of the other parts are the same as in the conventional construction.

The outer column 11a and steering column apparatus of this example can be applied to a steering apparatus in which a telescopic mechanism is assembled that is used for adjusting the forward/backward position of the steering wheel 4 according the size and operating posture of the operator. The steering column 2a of this example is made using a metal material, and is formed overall into a cylindrical shape, and is constructed such that the overall length is able to extend or contract by fitting the front section of an outer column 11a that is located on the rear side with the rear section of an inner column 10a that is located on the front side so as to be able to slide. A housing 15 is connected and fastened to the front-end section of the inner column 10a, and a front-side bracket 34 that is provided on the housing 15 is supported by and fastened to a vehicle body 1 (see FIG. 14) such that displacement in the forward/backward direction and up/down direction is prevented. The outer column 11a is supported by a support bracket 17a that is supported by a different location of the vehicle body 1 so that displacement in the forward/backward direction is possible.

A slit 19a having an L shape as seen in the radial direction is provided on the bottom surface of the front section, which is one half section in the axial direction, of the outer column 11a. The slit 19a is formed in order to lower the rigidity in the radial direction of a portion 33 on the front section of the outer column 11a that fits with and supports the inner column 10a, and makes it possible to elastically increase or reduce the inner diameter of the fitting and supporting portion 33. The slit 19a comprises a main slit section 36 and sub slit section 37. The main slit section 36 is formed in the axial direction (parallel to the center axis) of the outer column 11a in the center section in the width direction of the bottom surface of the outer column 11a and extends from the front-end section to the middle section in the axial direction of the outer column 11a. A pair of supported sections 20a, 20b is provided in positions on both sides in the width direction of the main slit 36. Longitudinally elongated holes 21, which correspond to through holes, are formed in portions of the pair of supported sections 20a, 20b that are aligned with each other. The sub slit section 37 is formed in the circumferential direction of the front end section, which corresponds to one end section of both end sections in the axial direction of the main slit section 36, and the front-end section of the main slit section 36 opens up to the edge on the rear side of part in the circumferential direction of the sub slit section 37. In the example illustrated in the figures, the width of the main slit section 36 and the width of the sub slit section 37 are nearly the same, however, these widths could also be different from each other. Moreover, a lock through hole 35 is provided in a portion of the outer circumferential surface of the rear section, which corresponds to the other half section in the axial direction, of the outer column 11a where the phase in the circumferential direction is separated from the slit 19a.

The pair of supported sections 20a, 20b is integrally formed when forming the outer column 11a by cast molding or by injection molding part of a cylindrical member. Alternatively, the pair of supported sections 20a, 20b can be formed by welding and fastening separate members to the bottom surface of the outer column.

In this example, of both end sections in the circumferential direction of the sub slit section 37, the length LA in the circumferential direction from the main slit section 36 of one end section in the circumferential direction (end section on the upper right side in FIG. 6) is sufficiently longer than the length LB in the circumferential direction from the main slit section 36 of the other end section in the circumferential direction (end section on the lower left side in FIG. 6) (LA>LB). In other words, the angle $\theta_A$ between the virtual line α that connects the center O of the inner column 10a and the center section in the width direction of the main slit section 36 and the virtual line β that connects the center O and the one end section in the circumferential direction of the sub split section 37 is greater than the angle $\theta_B$ between the virtual line α and the virtual line γ that connects the center O and the other end section in the circumferential direction of the sub split section 37 ($\theta_A > \theta_B$). More specifically, when the angle $\theta_A$ is taken to be 90 to 180 degrees, the angle $\theta_B$ is taken to be 0 to 30 degrees. In the example in the figures, the sub slit section 37 is provided in a range that covers half the circumference of the outer-circumferential surface of the front-end section of the outer column 11a. In other words, the angle between the virtual line β and the virtual line γ is taken to be 180 degrees. However, the range where the sub split section 37 is provided can be set by design according to the rigidity desired for the fitting and supporting portion 33. With construction such as this, the one half section in the width direction of the portion of the outer column 11a where the slit 19a is formed, or in other words, the range where the slit 19a is formed in the portion where one supported section 20a is located, is wider than the other half section in the width direction of the portion where the slit 19a is formed, or in other words, the range where the slit 19a is formed in the portion where the other supported section 20b is located. Therefore, the rigidity of the one half section in the width direction of the front section of the outer column 11a is lower than the rigidity in the width direction of the other half section in the width direction of the outer column 11a.

In the example in the figures, the other end section in the circumferential direction of the sub slit section 37 is located nearer the other supported section 20b in the width direction than the edge on the other side of the main slit section 36 (angle $\theta_B$ is taken to be about 15 degrees), and the inner-peripheral edge of the other end section in the circumferential direction of the sub slit section 37 has a partial arc shape (semicircular shape) as seen in the radial direction. As a result, when increasing or reducing the inner diameter of the fitting and supporting section 33 that is provided on the front section of the outer column 11a, the concentration of stress at the other end section in the circumferential direction of the sub slit section 37 and that at the front-end section of the main slit section 36 is suppressed. Moreover, a reinforcing rib 38 is provided in the portion of the bottom surface of the outer column 11a that surrounds the portion near the rear end of the main slit section 36 (portion of the main slit section 36 that is located further toward the rear than the rear-end surface of the supported sections 20a, 20b). By employing this kind of construction, the rigidity in the radial direction of the middle section in the axial direction of the outer column 11a is adjusted.

Moreover, in this example, the lock through hole 35 of a steering lock apparatus 39 is formed in a portion that is separated in the axial direction from the slit 19a, which is a portion on the other half section in the width direction of the rear section of the outer column 11a (upper half section in FIG. 2 and FIG. 4, and left half section in FIG. 3, FIG. 6 and FIG. 7) where the phase in the circumferential direction is separated in the upward direction from the other end section in the circumferential direction of the sub slit section 37. The steering lock apparatus 39 is constructed such that in the state in which the tip-end section of a lock unit 41 is located on the inside of the lock through hole 35, the lock unit 41 is supported by and fastened to the outer column 11a. An engaging hole 42 is provided in at least one of the locations in the circumferential direction of part of the steering shaft 3 where the phase in the axial direction coincides with that of the lock unit 41. Alternatively, it is possible to fasten a key-lock collar, in which a concave engaging section is formed, around at least one of the locations in the circumferential direction of part of the steering shaft 3 where the phase in the axial direction coincides with that of the lock unit. In either case, the steering lock apparatus 39 is such that during operation (key lock), the tip-end section of a lock pin 43 of the lock unit 41 displaces toward the inner-diameter side of the outer column 11a, and by the lock pin 43 engaging with the engaging hole 42 or concave engaging section, it essentially becomes impossible for the steering shaft 3 to rotate.

In this example, the support bracket 17a of the steering column apparatus is constructed by joining and fastening by welding or the like members that are formed by bending metal plate having sufficient strength and rigidity such as steel plate, and comprises an installation plate section 44 and a pair of left and right support-plate sections 22a, 22b. Installation holes 45 are provided in two locations in the width direction of the installation plate section 44, and the support bracket 17a is supported by and fastened to the vehicle body 1 by means such as inserting bolts through the installation holes 45 and screwing the bolts into screw holes that are provided in the vehicle body 1 and further tightening. Circular holes, which correspond to insertion holes, are formed in portions of the pair of support-plate sections 22a, 22b that are aligned with each other. In this example, of the pair of support-plate sections 22a, 22b, the rigidity in the width direction of one support-plate section 22a that is located on the outside in the width direction of one supported section 20a is less than the rigidity in the width direction of the other support-plate section 22b that is located on the outside in the width direction of the other supported section 20. More specifically, the plate thickness $T_A$ of the one support-plate section 22a is thinner than the plate thickness $T_B$ of the other support-plate section 22b ($T_A < T_B$). However, the rigidity in the width direction of the one support-plate section 22a can also be made less than the rigidity in the width direction of the other support-plate section 22b by providing a reinforcing rib between the other support-plate section 22b and the installation plate section 44, bending the other support-plate section 22b, or forming the other support-plate section 22b using a material having higher rigidity.

In the case of using either construction, an adjustment bolt 47, which is a rod shaped member, is inserted through the longitudinally elongated holes 21 and the circular holes 46. An expansion/contraction mechanism that is assembled on the adjustment bolt 47 is able to increase or reduce the space between the pair of support-plate sections 22a, 22b, making it possible to switch between a state in which the forward/backward position of the steering wheel 4 can be adjusted, and a state in which the steering wheel 4 can be maintained at the adjusted position. More specifically, an adjustment nut 48 is screwed onto the portion of the tip-end section (left-end section in FIG. 3 and FIG. 6) of the adjustment bolt 47 that protrudes from the outside surface of the other support-plate section 22b. The base-end section of an adjustment lever 25a is fastened to the inside surface of the adjustment nut 48. When adjusting the forward/backward position of the steering wheel 4, the adjustment lever 25a is rotated in a specified direction, which increases the space between the adjustment nut 48 and the head section 49 of the adjustment bolt 47. As a result, the force by which the adjustment lever 25a and head section 49, which are a pair of pressure sections, press against the outside surface of the pair of support-plate sections 22a, 22b, and the force by which the inside surfaces of the support-plate sections 22a, 22b press against the outside surfaces of the pair of supported sections 20a, 20b are released.

In this example, the rigidity in the width direction of the one support-plate section 22a of the pair of support-plate sections 22a, 22b is less than the rigidity in the width direction of the other support-plate section 22b, so as the adjustment lever 25a is operated, mainly the one support-plate section 22a elastically deforms in a direction away from the other support-plate section 22b. In other words, the amount of elastic deformation toward the outside in the width direction of the one supported section 20a becomes greater than the amount of elastic deformation toward the outside in the width direction of the other supported section 20b. Moreover, at the same time that the force by which the inside surfaces of the support-plate section 22a, 22b press against the outside surfaces of the pair of supported sections 20a, 20b is released, the inner diameter of the fitting and supporting portion 33 of the outer column 11a is elastically increased, which decreases the pressure that acts on the area of contact between the inner-circumferential surface of the outer column 11a and the outer-circumferential surface of the inner column 10a.

Moreover, the rigidity in the width direction of the portion where the one supported section 20a of the pair of supported sections 20a, 20b is located (one half section in the width direction) is less than the rigidity in the width direction of the portion where the other supported section 20b is located (the other half section in the width direction), so mainly by the one half section in the width direction of the front section of the outer column 11a elastically deforming in a direction such that the one supported section 20a separates from the other supported section 20b, the inner diameter of the fitting and supporting portion 33 of the outer column 11a elastically increases. Then in a state in which the force by which the inside surface of the support-plate sections 22a, 22b press against the outside surfaces of the pair of supported sections 20a, 20b is released, and the surface pressure acting at the area of contact between the inner-circumferential surface of the outer column 11a and the outer-circumferential surface of the inner column 10a is decreased, the forward/backward position of the steering wheel 4 can be adjusted within the range that the adjustment bolt 47 can displace inside the longitudinally elongated holes 21.

Figure 15:
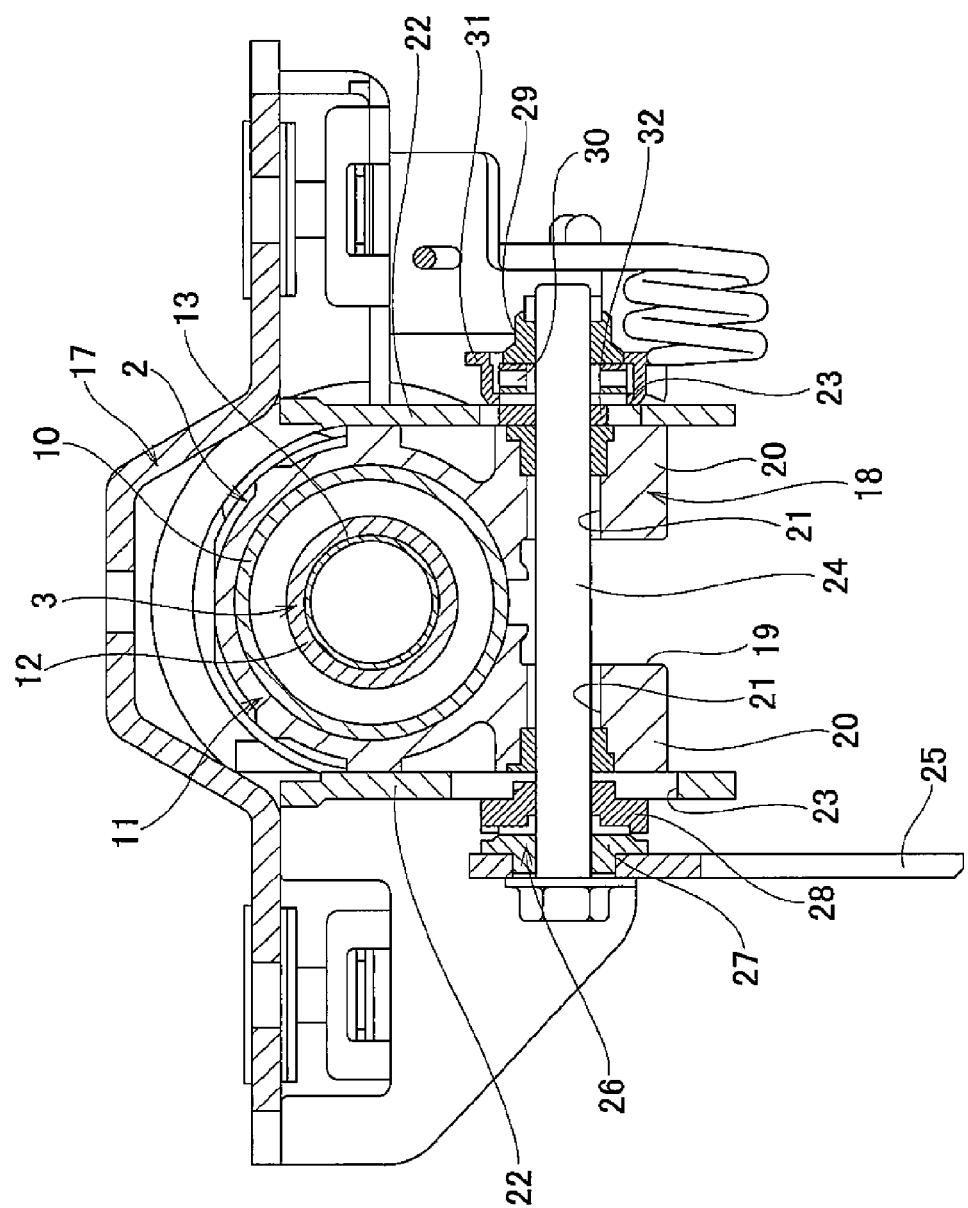
FIG. 15 is a cross-sectional view illustrating an example of a conventional telescopic steering column apparatus.

After the steering wheel 4 has been moved to a desired position, the adjustment lever 25a is operated in the opposite direction, which reduces the space between the adjustment nut 48 and the head section 49 of the adjustment bolt 47. As a result, mainly the one support-plate section 22a elastically deforms in a direction toward the other support-plate section 22b, the space between the pair of support-plate sections 22a, 22b is reduced and the support-plate sections 22a, 22b firmly press against the pair of supported sections 20a, 20b. At the same time, mainly, by the one half section in the width direction of the front section of the outer column 11a elastically deforming in the direction in which the one supported section 20a moves toward the other supported section 20b, the inner diameter of the fitting and supporting portion 33 of the outer column 11a is elastically reduced, and the surface pressure that acts at the area of contact between the inner-circumferential surface of the outer column 11a and the outer-circumferential surface of the inner column 10a increases. As a result, the forward/backward position of the steering wheel 4 is stably maintained at the adjusted position. The expansion/contraction mechanism is not limited to the construction described above, and it is also possible to use a cam apparatus 26 (see FIG. 15) that is able to increase or reduce the dimension in the axial direction based on the operation of the adjustment lever.

With the outer column 11a and the steering column apparatus of this example, it is possible to improve the ease of operation when adjusting the forward/backward position of the steering wheel 4. In other words, in this example, the rigidity in the width direction of the portion of the front section of the outer column 11a where the one supported section 20 of the pair of supported sections 20a, 20b is located is less than the rigidity in the width direction of the portion where the other supported section 20b is located. As a result, when the inner diameter of the fitting and supporting portion 33 of the outer column 11a is increased or reduced, mainly the one half section in the width direction where the one supported section 20a is located elastically deforms easily. In addition, of the pair of support-plate sections 22a, 22b, the rigidity in the width direction of the one support-plate section that is arranged on the outside in the width direction of the one supported section 20a is less than the rigidity in the width direction of the other support-plate section 22b that is arranged on the outside in the width direction of the other supported section 20b. As a result, when the space between the adjustment nut 48 and head section 49 of the adjustment bolt 47, which is a pair of pressure sections, is increased or reduced, mainly the one support-plate section 22a elastically deforms easily.

Therefore, when the adjustment lever 25a is operated in order to adjust the forward/backward position of the steering wheel 4, as the space between the adjustment nut 48 and the head section 49 of the adjustment bolt 47 is increased without particularly enlarging the force for operating the adjustment lever 25a due to the one half section in width direction of the front section of the outer column 11a where the one supported section 20a is located and the one support-plate section 22a easily deforming, a state is achieved in which the force by which the inside surfaces of the pair of support-plate sections 22a, 22b press against the outside surfaces of the pair of supported sections 20a, 20b is sufficiently decreased or lost, and the contact pressure between the inner-circumferential surface of the outer column 11a and the outer-circumferential surface of the inner column 10a is sufficiently reduced or lost. Moreover, it is also possible to keep the friction force that acts between the inside surfaces of the support-plate sections 22a, 22b and the outside surfaces of the supported sections 20a, 20b, and the friction force that acts between the inner-circumferential surface of the outer column 11a and the outer-circumferential surface of the inner column 10a sufficiently low, and thus it is possible to easily adjust the forward/backward position of the steering wheel 4. After the steering wheel 4 has been adjusted to a desired position, the adjustment lever 25a is operated in the opposite direction, and as the space between the adjustment nut 48 and the head section 49 of the adjustment bolt 47 is reduced, the force that reduces the space between the adjustment nut 48 and the head section 49 of the adjustment bolt 47 due to the one half section in the width direction where the one supported section 20a is located easily deforming is effectively used as a force for reducing the space between the inside surfaces of the support-plate sections 22a, 22b, a force for reducing the space between the pair of supported sections 20a, 20b, and a force for reducing the inner diameter of the fitting and supporting portion 33 of the outer column 11a. Therefore, it is possible maintain the forward/backward position of the steering wheel 4 at the adjusted position without particularly enlarging the force for operating the adjustment lever 25a.

Moreover, in this example, the lock through hole 35 is formed in the other half section in the width direction of the outer column 11a on the side where the other supported section 20b is located and in the portion separated in the axial direction and circumferential direction from the slit 19a where the rigidity is high. Therefore, when the steering lock apparatus 39 is operated and the tip-end section of the lock pin 43 is engaged with the engaging hole 42, together with the existence of the reinforcing rib 38, it is possible to make it difficult for the outer column 11a, including the peripheral edges of the slit 19a, to be damaged by deformation or the like even when a large force is applied to the peripheral edges of the lock through hole 35 in an attempt to rotate the steering wheel 4 with a large force.

It is also possible to assemble a tilt mechanism for adjusting the up/down position of the steering wheel in the telescopic steering apparatus of this example. In that case, the front-side bracket 34 that is provided on the front-end section of the inner column 10a is supported by a horizontal shaft that is arranged in the width direction of the vehicle body so as to be able to pivotally displace around that horizontal shaft, and instead of the circular holes 46, vertically elongated holes preferably having a partial arc shape that is centered around the horizontal shaft is provided as insertion holes in portions of the pair of support-plate sections 22a, 22b that are aligned with each other, and a rod-shaped member such as an adjustment bolt 47 is inserted through these vertically elongated holes.

Moreover, in this example, the inner column 10a is arranged on the front side and the outer column 11a is arranged on the rear side, however, it is also possible to reverse the positional relationship in the front/rear direction. In other words, the steering column can be constructed such that the overall length can be extended or contracted by fitting the front section of the inner column inside the rear section of the outer column. In that case, circular holes are formed instead of the longitudinally elongated holes in portions of the pair of supported sections of the outer column that are aligned with each other. Moreover, it is also possible to reverse the positional relationship in the up/down direction. In other words, it is possible to provide a pair of supported sections on the top surface side of the outer column, and to arrange a rod-shaped member such as an adjustment bolt in the upper part of the outer column.

Second Example

Figure 1:
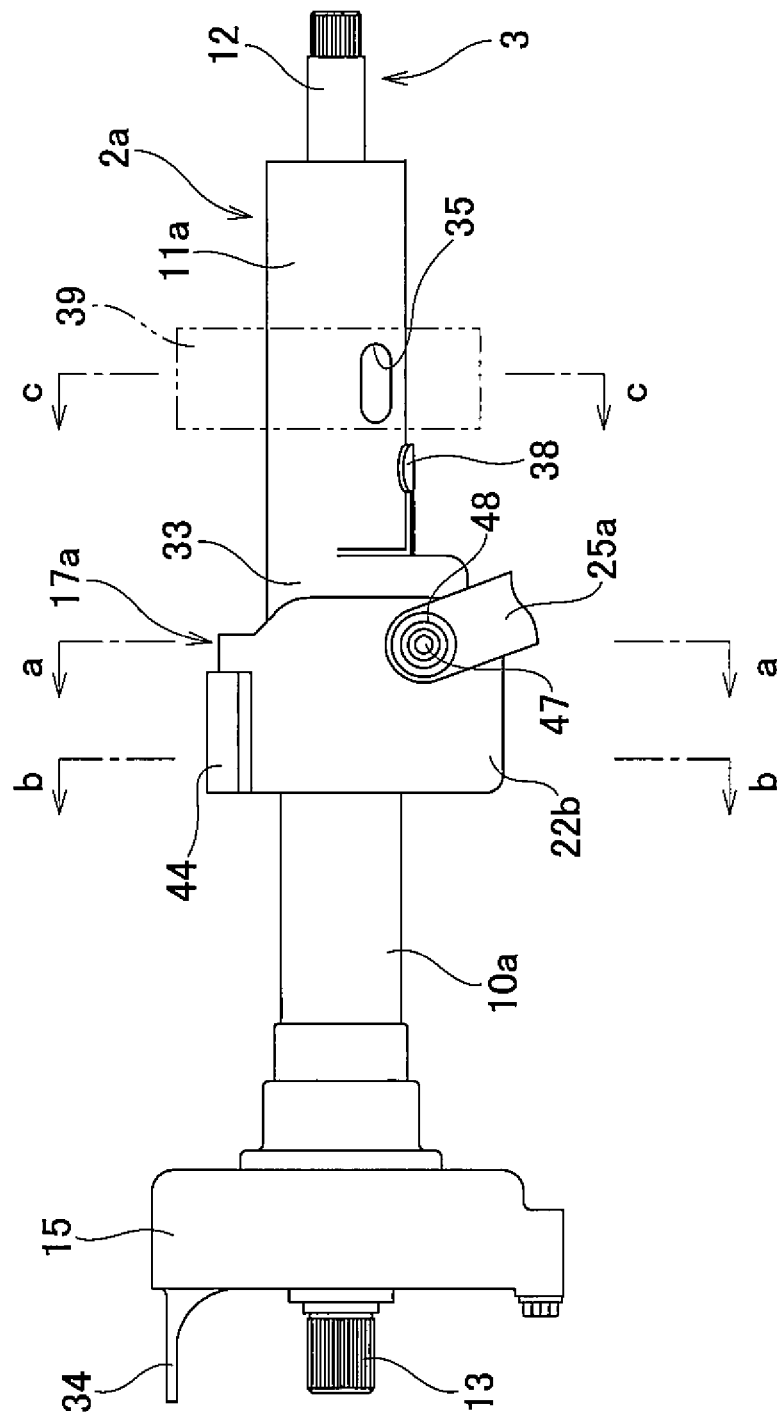
FIG. 1 is a side view illustrating the main parts of a steering apparatus that comprises the steering column apparatus of a first example of an embodiment of the present invention.
Figure 2:
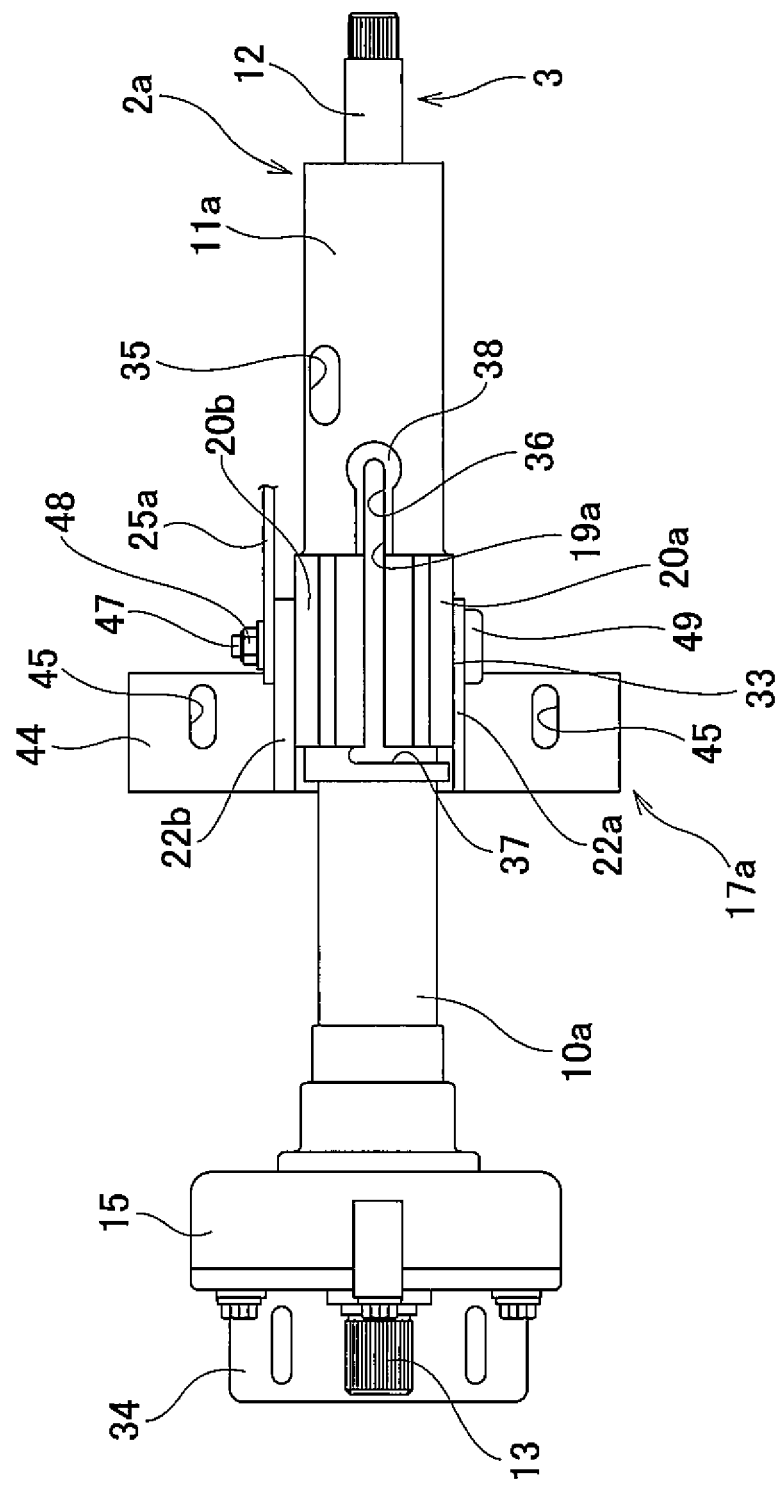
FIG. 2 is a bottom view of this first example as seen from the bottom in FIG. 1.
Figure 3:
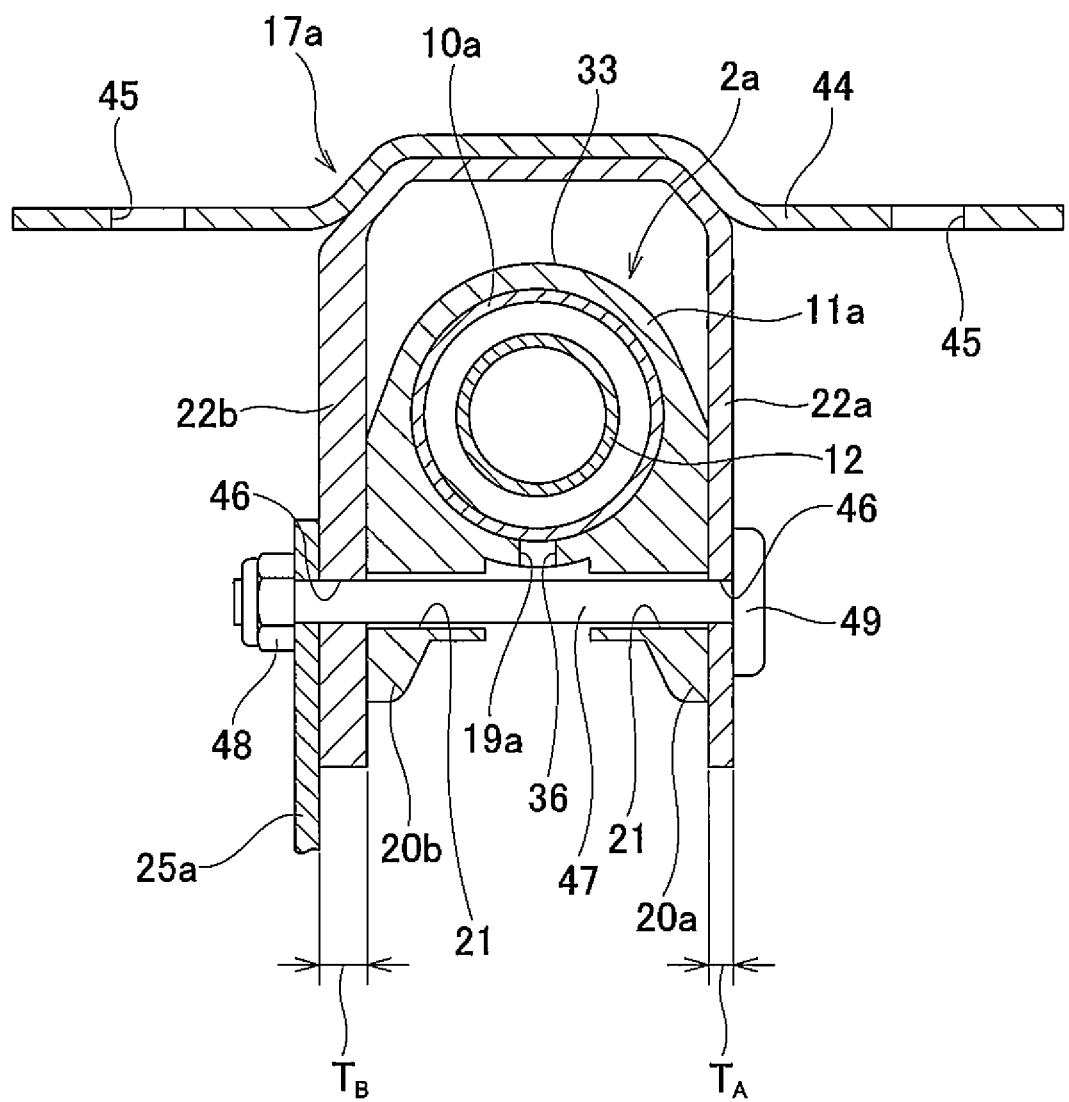
FIG. 3 is a cross-sectional view of section a-a in FIG. 1 of this first example.
Figure 4:
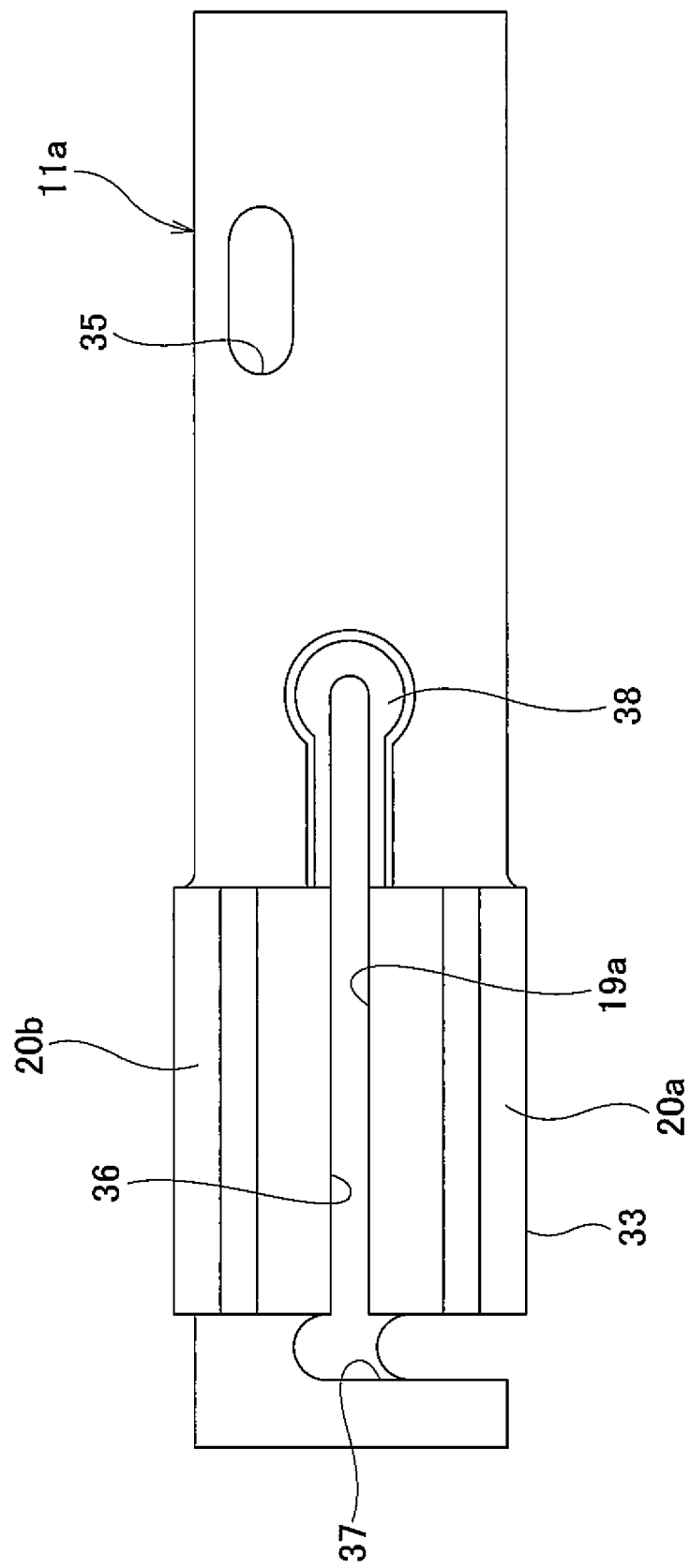
FIG. 4 is a bottom view of the outer column of this first example.
Figure 5:
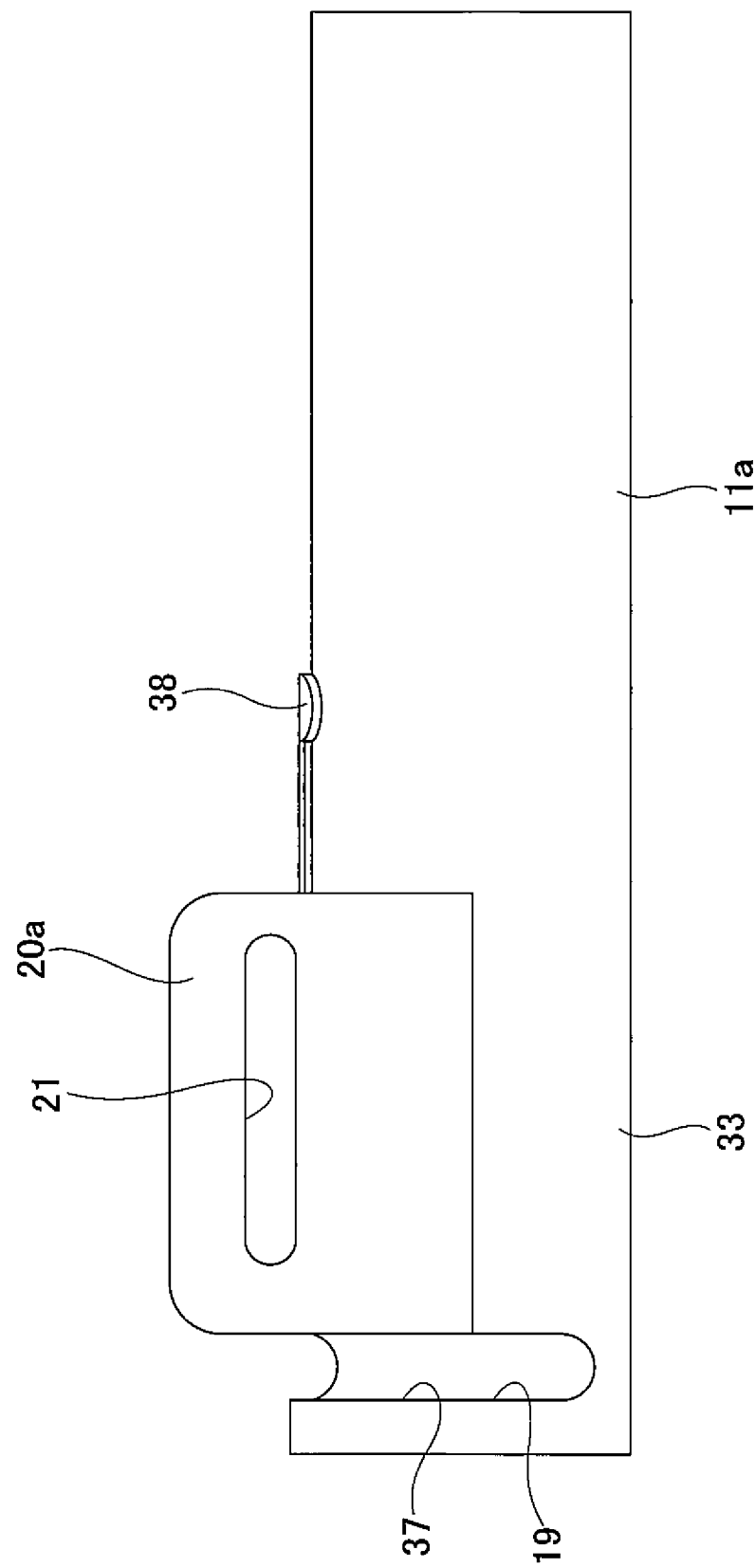
FIG. 5 is a side view of the outer column of this first example.
Figure 6:
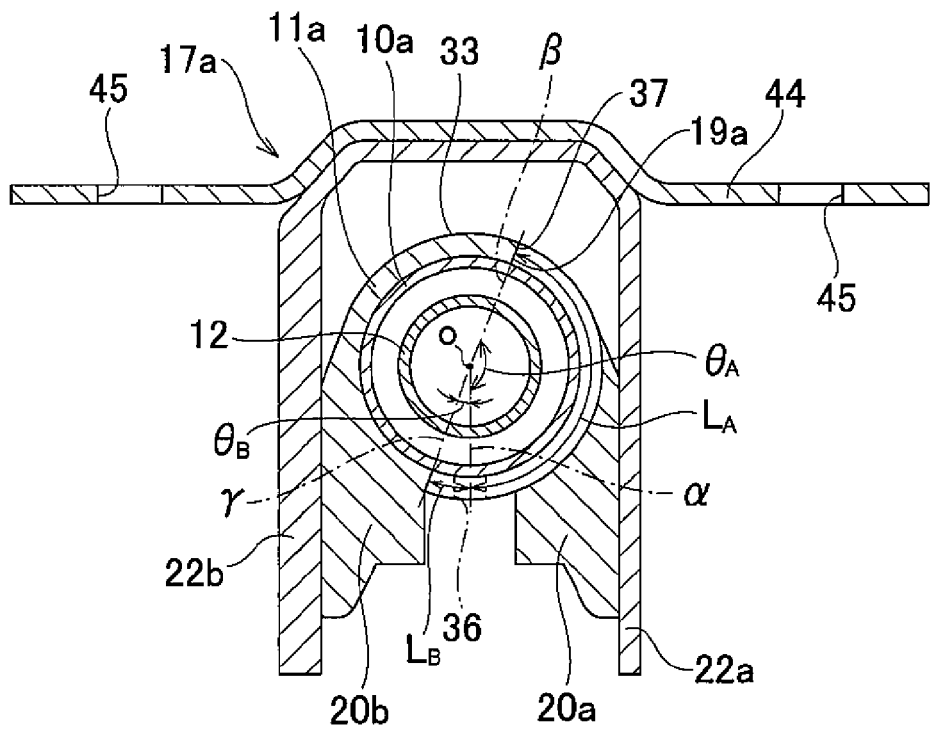
FIG. 6 is a cross-sectional view of section b-b in FIG. 1 of this first example.
Figure 7:
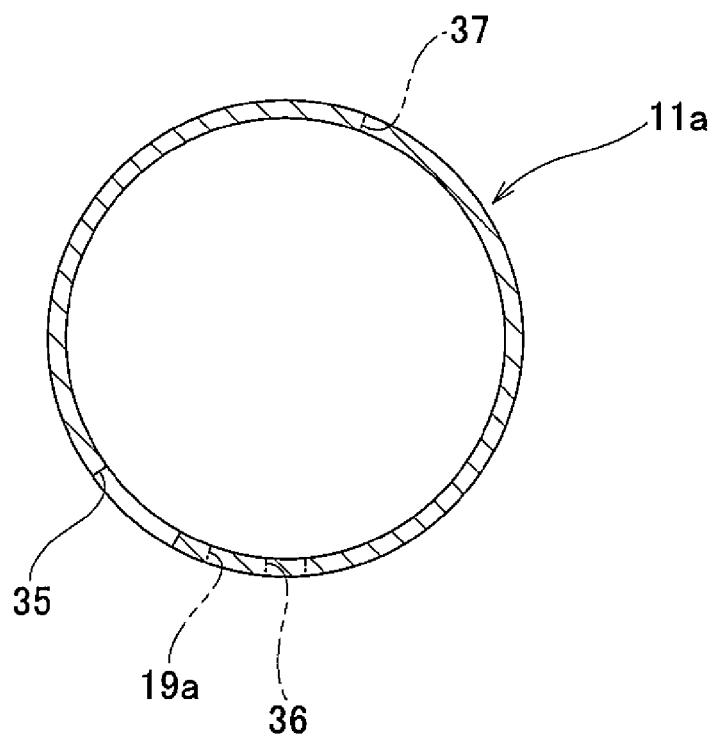
FIG. 7 is a cross-sectional view for explaining the formation position of lock holes of this first example.
Figure 8:
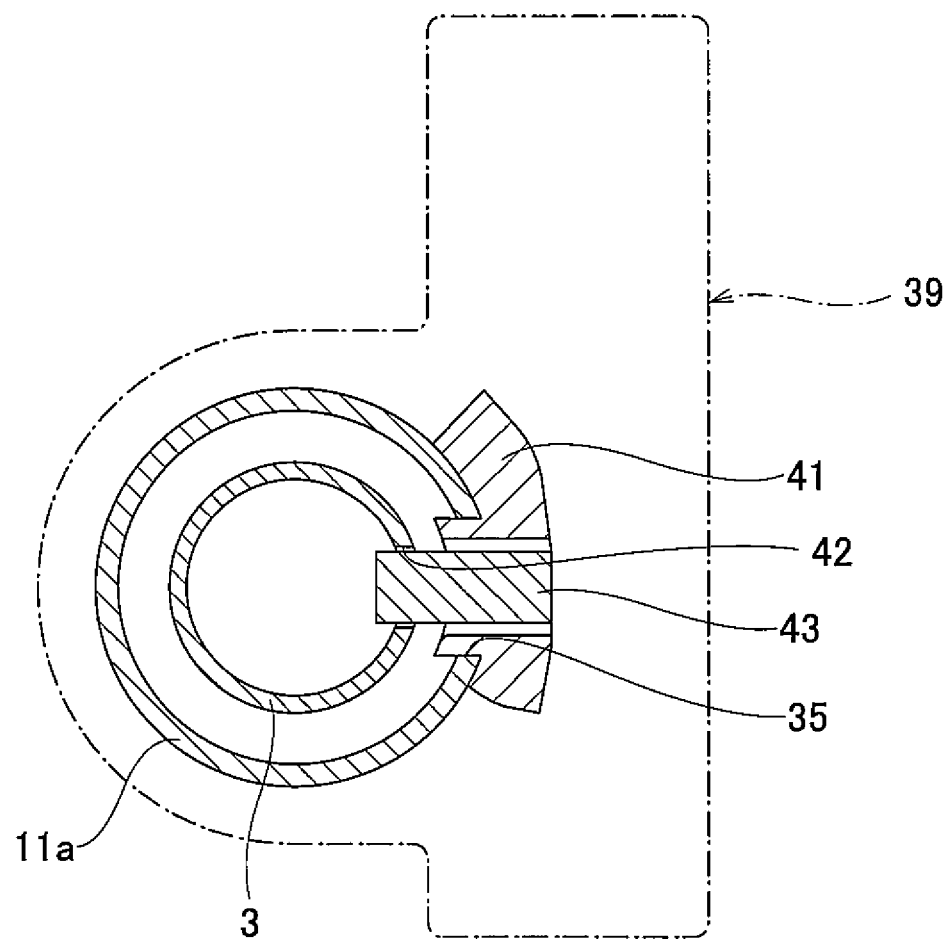
FIG. 8 is a cross-sectional view of section c-c in FIG. 1 of this first example.
Figure 9:
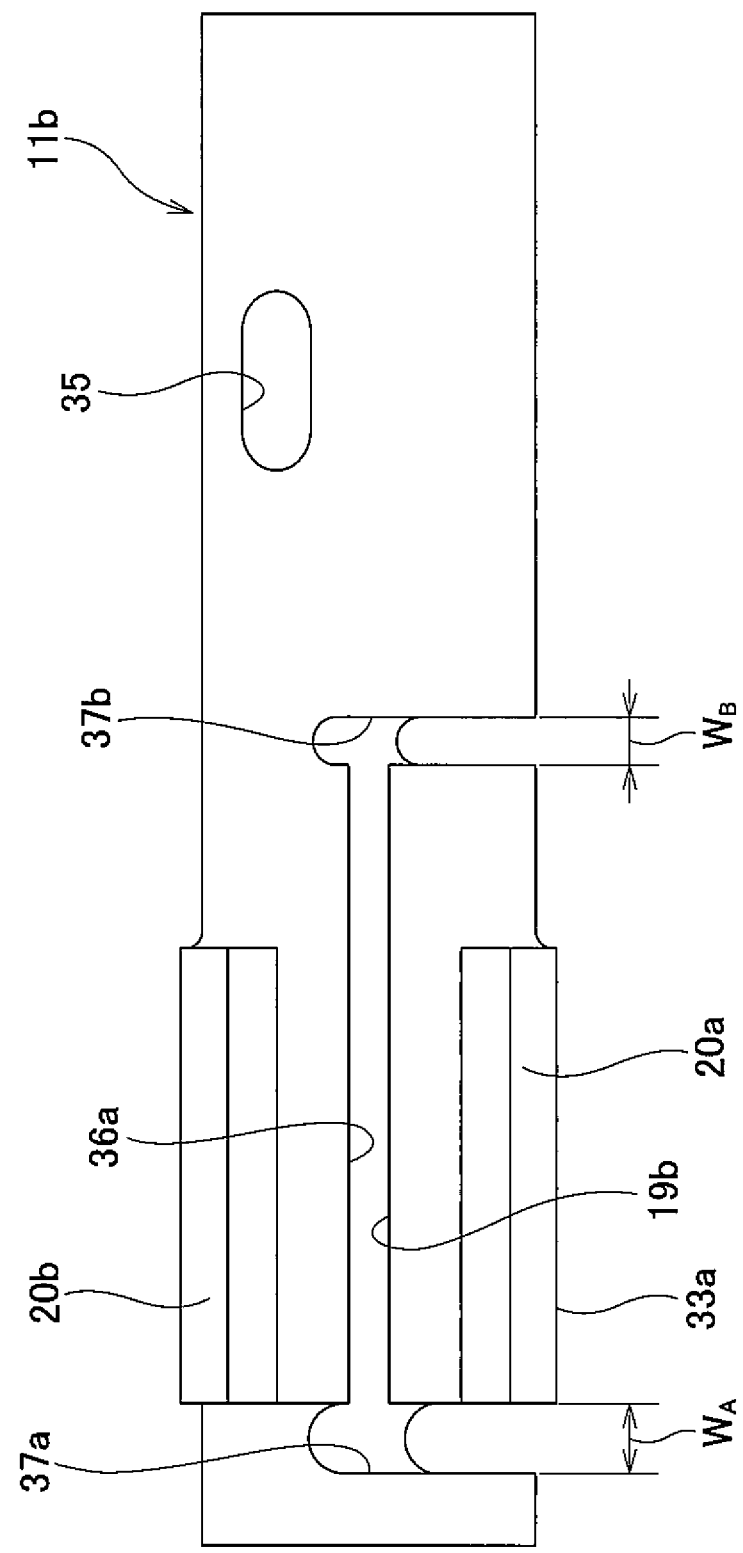
FIG. 9 is a drawing similar to FIG. 4 and illustrates a second example of an embodiment of the present invention.

FIG. 9 illustrates a second example of an embodiment of the present invention. An H-shaped or U-shaped slit 19b as seen in the radial direction is formed in the bottom surface of the front section of the outer column 11b of this example. The slit 19b comprises a main slit section 36a and a pair of front and rear sub slit sections 37a, 37b. The main slit section 36a is formed in the center section in the width direction of the bottom surface of the outer column 11b so as to extend in the axial direction (parallel to the center axis) of the outer column 11b from the portion between the pair of left and right supported sections 20a, 20b to the middle section in the axial direction. The pair of sub slit sections 37a, 37b is formed in the circumferential direction on both the front and rear end sections of the main slit section 36a, and both the front and rear end sections of the main slit section 36a are open to the side edges of the sub slit sections 37a, 37b. Of both end sections in the circumferential direction of the sub slit sections 37a, 37b, the length in the circumferential direction from the main slit section 36a of one end section (bottom side in FIG. 9) in the circumferential direction is longer than the length in the circumferential direction from the main slit section 36 of the other end section in the circumferential direction. With this kind of construction, the rigidity in the width direction of the one half section in the width direction where one supported section 20a is located is less than the rigidity in the width direction of the other half section in the width direction where the other supported section 20b is located.

In the example in the figure, the width $W_A$ in the front/rear direction of the sub slit section 37a on the front side is greater than the width $W_B$ in the front/rear direction of the sub slit section 37b on the rear side ($W_A$>$W_B$). Moreover, the length in the circumferential direction of the end sections in the circumferential direction (one end section and other end section in the circumferential direction) of the sub slit section 37a on the front side from the main slit section 36a and the length in the circumferential direction of the end sections in the circumferential of the sub slit section 37b on the rear side are the same as each other. However, these lengths in the circumferential direction can be made to differ from each other, and the width in the front/rear direction of the sub slit section 37a on the front side and the width in the front/rear direction of the sub slit section 37b on the rear side can be made to be the same as each other. In other words, the lengths in the circumferential direction of the end sections from the main slit section 36a and the widths in the front/rear direction of the pair of sub slit sections 37a, 37b are set by design according to the size of the rigidity that is desired for the fitting and supporting portion 33a of the outer column 11b.

In this example as well, as in the first example of an embodiment, a lock through hole 35 is formed in the outer column 11b in the other half section in the width direction on the side where the other supported section 20b is located, and in the portion separated in the axial direction and circumferential direction from the slit 19b where the rigidity is high. Therefore, in a state in which the steering lock apparatus 39 (see FIG. 8) is operated and the tip-end section of the lock pin 43 is engaged with the engaging hole 42, it is possible to make it difficult for the outer column 11b, including the peripheral edges of each end section of the slit 19b, to be damaged by deformation or the like even when a large force is applied to the peripheral edge sections of the lock through hole 35 in an attempt to rotate the steering wheel 4 (see FIG. 14) with a large force. The construction and function of the other parts are the same as in the first example of an embodiment.

Third Example

Figure 10:
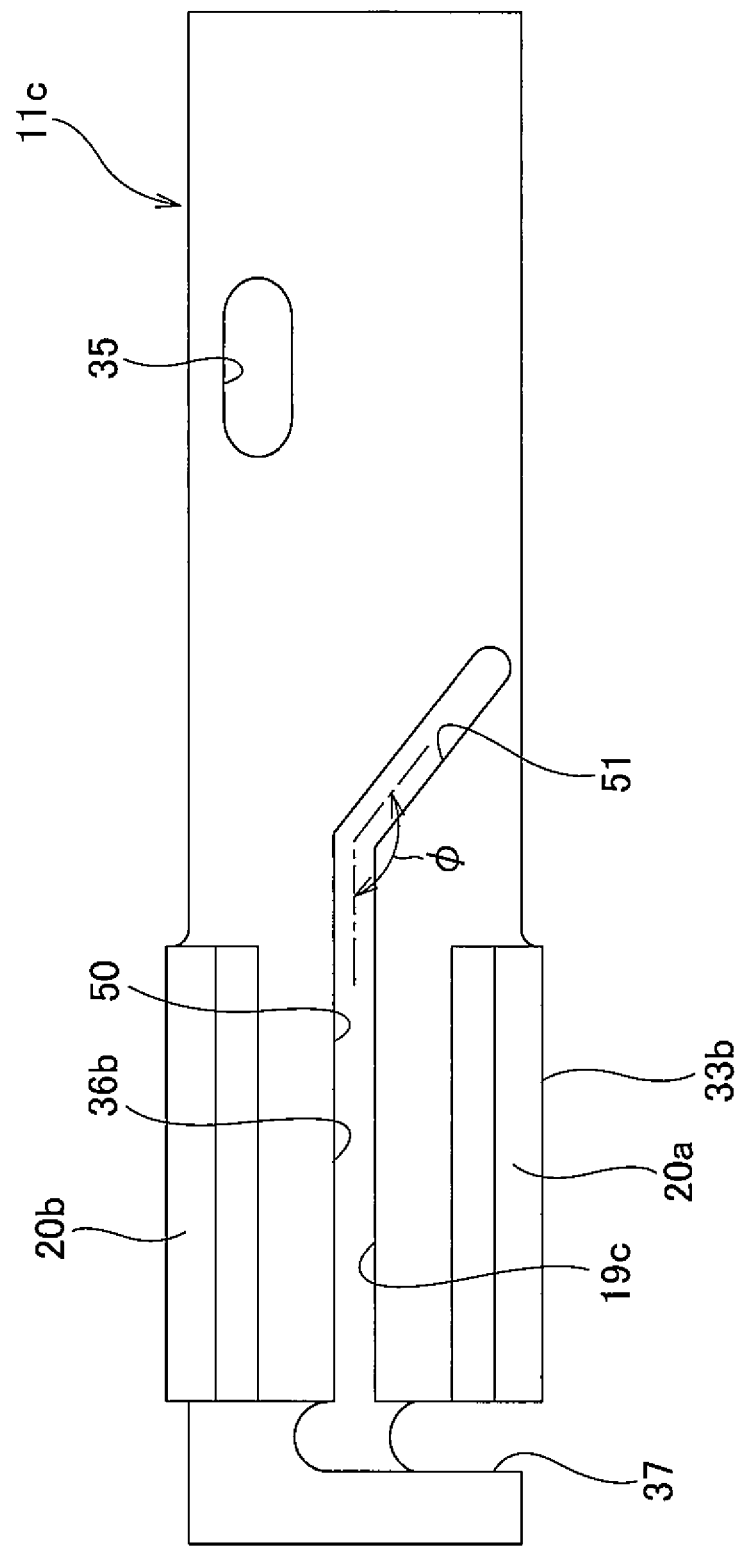
FIG. 10 is a drawing similar to FIG. 4 and illustrates a third example of an embodiment of the present invention.

FIG. 10 illustrates a third example of an embodiment of the present invention. A slit 19c that comprises a main slit section 36b and a sub slit section 37, with the front-end section of the main slit section 36b being open to the edge on the rear side thereof, is formed in the bottom surface of the front section of the outer column 11c. In this example, the main slit section 36b comprises a straight section 50 and an inclined section 51. The straight section 50 is formed in the axial direction (parallel with the center axis) of the outer column 11c in a portion in the center in the width direction of the outer column 11c that extends from the portion between the pair of left and right supported sections 20a, 20b to the middle section in the axial direction. The inclined section 51 is formed so as to be continuous from the rear-end section of the straight section 50, and extends in a direction toward the one half section in the width direction of the outer column 11c, or in other words, in one circumferential direction (downward in FIG. 10) while going toward the rear. In this example, the distance in the circumferential direction between the rear-end section of the slit 19c (inclined section 51 of the main slit section 36b) and the lock through hole 35 can be made longer than in the case in which the main slit section 36, 36a is formed along the axial direction in the axial direction of the outer column 11a, 11b as in the first example and second example of an embodiment, and while it is possible to further reduce the rigidity of the one half section in the width direction of the outer column 11c, it is also possible to maintain the rigidity that is required for the outer column 11c during operation of the steering lock apparatus 39 (see FIG. 8). The angle φ of inclination of the inclined section 51 with respect to the straight section 50 is set by design within the range 90 degrees or greater but less than 180 degrees according to the size of the rigidity that is desired for the fitting and supporting portion 33b of the outer column 11c. The construction and function of the other parts are the same as in the first example of an embodiment.

Fourth Example

Figure 11:
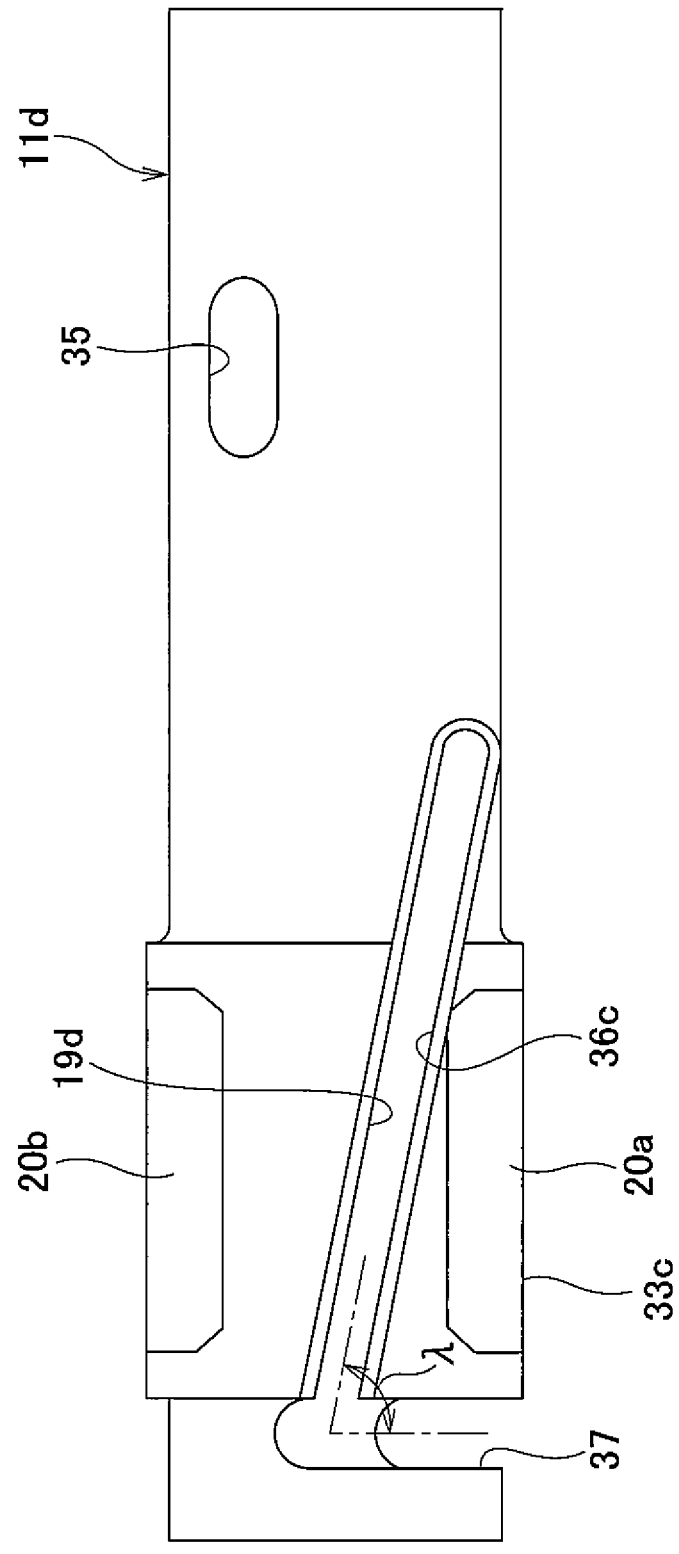
FIG. 11 is a drawing similar to FIG. 4 and illustrates a fourth example of an embodiment of the present invention.

FIG. 11 illustrates a fourth example of an embodiment of the present invention. A slit 19d that comprises a main slit section 36c and a sub slit section 37 is provided in the bottom surface of the front section of the outer column 11d of this example. The main slit section 36c is formed so that the front-end section thereof is located in the center section in the width direction of the bottom surface of the outer column 11d, and extends in a direction toward the one half section in the width direction, or in other words, in one circumferential direction (downward in FIG. 11) while going toward the rear. In this example as well, as in the third example of an embodiment, the distance in the circumferential direction between the rear-end section of the slit 19d (main slit section 36c) and lock through hole 35 can be made to be longer than in the case when the main slit section is formed along the axial direction in the direction of the outer column. The angle λ of inclination of the main slit section 36c with respect to the sub slit section 37 can be set by design within the range 60 degrees or greater but less than 90 degrees according to the size of the rigidity that is desired for the fitting and supporting portion 33c of the outer column 11d. The construction and function of the other parts is the same as in the first and third examples of an embodiment.

Fifth Example

Figure 12:
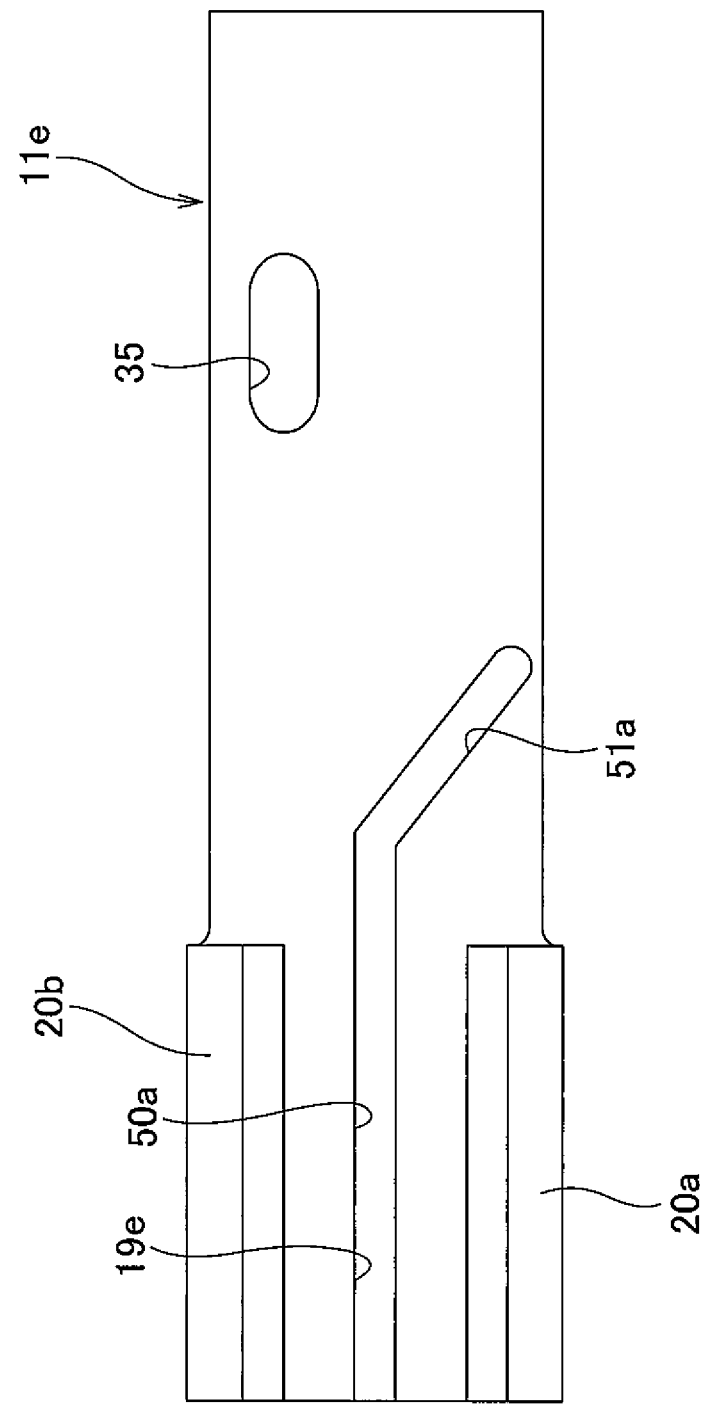
FIG. 12 is a drawing similar to FIG. 4 and illustrates a fifth example of an embodiment of the present invention.

FIG. 12 illustrates a fifth example of an embodiment of the present invention. A slit 19e that comprises a straight section 50a and an inclined section 51a is provided in the bottom surface of the front section of the outer column 11e of this example. The straight section 50a is formed in the axial direction (parallel with the center axis) of the outer column 11e such that the front-end section thereof is open to the front-end edge of the center section in the width direction of the outer column 11e, and in a portion that extends from the front-end edge to the middle section in the axial direction of the outer column 11e. The inclined section 51a is formed so as to be continuous from the rear-end section of the straight section 50a, and extends in a direction toward the side of the one half section in the width direction, or in other words, in one circumferential direction (downward in FIG. 12), while going toward the rear. The construction and function of the other parts are the same as in the first and third examples of an embodiment.

Sixth Example

Figure 13:
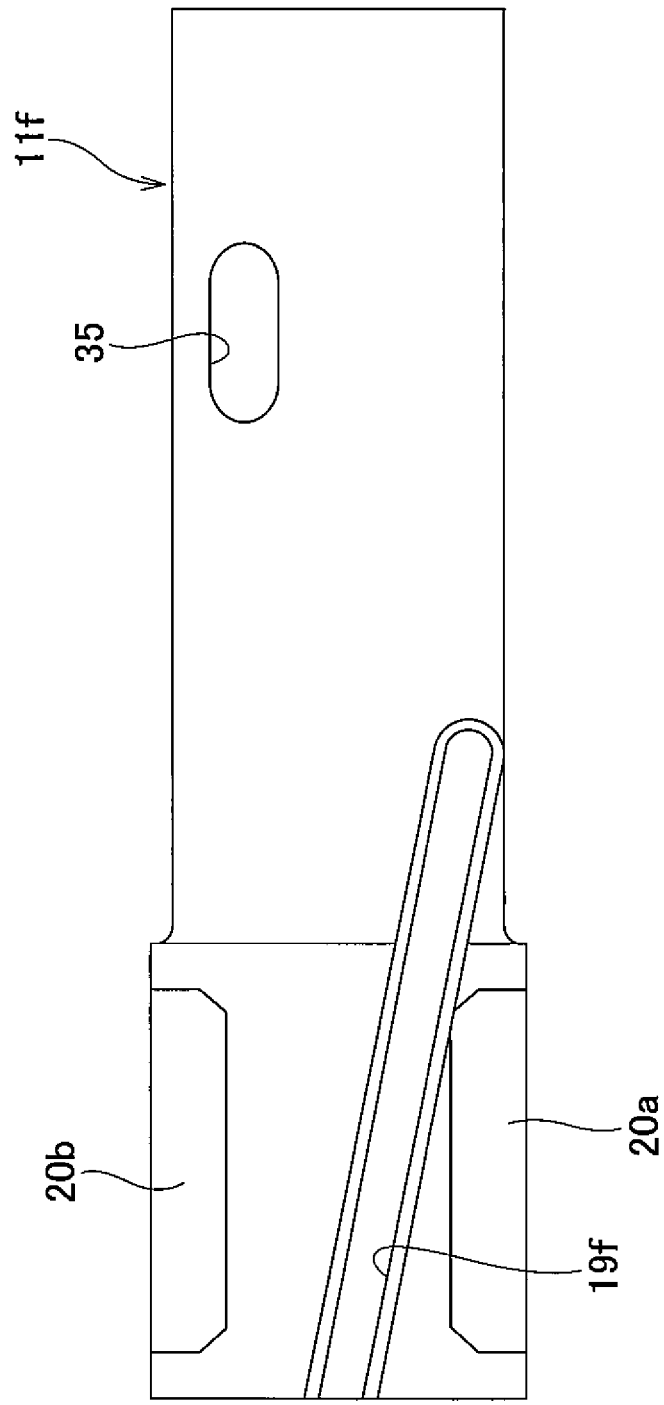
FIG. 13 is a drawing similar to FIG. 4 and illustrates a sixth example of an embodiment of the present invention.

FIG. 13 illustrates a sixth example of an embodiment of the present invention. A slit 19f is provided in the bottom surface of the front section of the outer column 11*f* of this example. The slit 19*f* is formed such that the front-end section thereof is open on the front-end edge of the center section in the width direction of the outer column 11*f*, and so as to extend from the front-end edge of the outer column 11*f* to the middle section in the axial direction and so as to be directed toward the side of the one half section in the width direction from the center section in the width direction, or in other words, in one circumferential direction (downward in FIG. 13), while going toward the rear. The construction and function of the other parts are the same as in the first and fourth examples of an embodiment.

EXPLANATION OF REFERENCE NUMBERS

1 Vehicle body
2, 2*a* Steering column
3 Steering shaft
4 Steering wheel
5*a*, 5*b* Universal joint
6 Intermediate shaft
7 Steering-gear unit
8 Input shaft
9 Tie rod
10, 10*a* Inner column
11, 11*a* to 11*f* Outer column
12 Outer tube
13 Inner shaft
14 Electric motor
15 Housing
16 Horizontal shaft
17 Support bracket
18 Column-side bracket
19, 19*a* to 19*f* Slit
20, 20*a*, 20*b* Supported section
21 Longitudinally elongated hole
22, 22*a*, 22*b* Support-plate section
23 Vertically elongated hole
24 Adjustment rod
25, 25*a* Adjustment lever
26 Cam apparatus
27 Drive-side cam
28 Driven-side cam
29 Nut
30 Thrust bearing
31 Pressure plate
32 Engaging piece
33 Fitting and supporting portion
34 Front-side bracket
35 Lock through hole
36, 36*a* to 36*c* Main slit section
37, 37*a*, 37*b* Sub slit section
38 Reinforcing rib
39 Steering-lock apparatus
40 Lock through hole
41 Lock unit
42 Engaging hole
43 Lock pin
44 Installation-plate section
45 Installation hole
46 Circular hole
47 Adjustment bolt
48 Adjustment nut
49 Head section
50, 50*a* Straight section
51, 51*a* Inclined section

What is claimed is:

1. An outer column, the outer column formed using a metal material into a cylindrical shape as a whole, and constructing a steering column by fitting with an inner column so that sliding is possible, and the outer column comprising:
    a slit formed in one half section in an axial direction of the outer column for decreasing a rigidity in a radial direction of the one half section in the axial direction; and
    a pair of supported sections provided in positions on both sides of the slit in a width direction of the outer column, with through holes formed in portions of the pair of supported sections that are aligned with each other;
    the slit comprising a main slit section formed in the axial direction; and a sub slit section formed in a circumferential direction of a front-end section of both end sections in the axial direction of the main slit section in case that the outer column is arranged on a rear side, or in a circumferential direction of a rear-end section of both end sections in the axial direction of the main slit section in case that the outer column is arranged on a front side, with the front or rear end section in the axial direction of the main slit section being open to part in the circumferential direction of the sub slit section;
    a length in the circumferential direction from the main slit section to one end section of both end sections of the sub slit section, which is in one half section in the width direction of the outer column is, longer than a length in the circumferential direction from the main slit section to the other end section which is in the other half section in the width direction of the outer column;
    a first area of the slit in the one half section in the width direction is larger than a second area of the slit in the other half section in the width direction, and
    a rigidity in the width direction of the one half section in width direction of a portion of the outer column where the slit is formed is less than a rigidity in the width direction of the other half section in the width direction of the portion of the outer column where the slit is formed.

2. The outer column according to claim 1, wherein
    the main slit section comprises a straight section formed in a center section in the width direction; and
    an inclined section that is continuous from the rear-end section of the main slit section in case that the outer column is arranged on the rear side, or is continuous from the front-end section of the main slit section in case that the outer column is arranged on the front side, and extends in the circumferential direction toward a side of the one half section in the width direction while going toward the rear in case that the outer column is arranged on the rear side, or while going toward the front in case that the outer column is arranged on the front side.

3. The outer column according to claim 1, wherein the main slit is such that the front-end section of the main slit is located in a center section in the width direction in case that the outer column is arranged on the rear side, or the rear-end section of the main slit is located in the center section in the width direction in case that the outer column is arranged on the front side, and extends in the circumferential direction toward a side of the one half section in the width direction while going toward the rear in case that the outer column is arranged on the rear side, or while going toward the front in case that the outer column is arranged on the front side.

4. The outer column according to claim 1, wherein a lock through hole for inserting a lock pin of a steering-lock apparatus is provided in part of the other half section in the axial direction on the side of the other half section in the width direction.

5. A steering-column apparatus comprising:
a steering column, a support bracket, a rod-shaped member and an expansion/contraction mechanism; wherein
the steering column is constructed by combining together an outer column and an inner column that fits with and is supported by one half in the axial direction of the outer column so that one half in the axial direction inner column is able to displace in the axial direction, and the steering column is able to extend or contract freely in the axial direction, and an extendable/contractible steering shaft is supported on the inside of the steering column so as to be able to rotate freely;
the outer column is formed using a metal material into a cylindrical shape as a whole, and is constructing a steering column by fitting with the inner column so that sliding is possible;
the support bracket supports the steering column with respect to a vehicle body so that at least the forward and backward position of a steering wheel can be adjusted, and the support bracket comprises a pair of support-plate sections located on both sides in the width direction of the pair of supported sections, and insertion holes formed in portions of the pair of support-plate sections that are aligned with each other;
the rod-shaped member is inserted in the width direction through the through holes and the insertion holes and comprises a pair of pressure sections in portions on both ends thereof that face the outside surfaces of the pair of support-plate sections;
the expansion/contraction mechanism increases or reduces the space between the inside surfaces of the pair of support-plate sections by increasing or reducing the space between the pair of pressure sections; and
the rigidity in the width direction of one support-plate section of the pair of support-plate sections, that is arranged on the outside in the width direction of the supported section on the side of the one half section in the width direction, is less than the rigidity in the width direction of the other support-plate section that is arranged on the outside in the width direction of the supported section on the side of the other half section in width direction.

* * * * *